United States Patent
Sharma et al.

(10) Patent No.: US 10,360,198 B2
(45) Date of Patent: Jul. 23, 2019

(54) SYSTEMS AND METHODS FOR PROCESSING BINARY MAINFRAME DATA FILES IN A BIG DATA ENVIRONMENT

(71) Applicant: American Express Travel Related Services Company, Inc., New York, NY (US)

(72) Inventors: Nitish Sharma, Bangalore (IN); Shubham Arora, Meerut (IN); Balaji Balaraman, Bangalore (IN); Sandeep Bose, Scottsdale, AZ (US); Arindam Chatterjee, Bangalore (IN); Sastry Durvasula, Phoenix, AZ (US); Priya Narayana, Bangalore (IN); Manoj Kumar Rana, Bangalore (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 762 days.

(21) Appl. No.: 14/994,965

(22) Filed: Jan. 13, 2016

(65) Prior Publication Data

US 2017/0199896 A1    Jul. 13, 2017

(51) Int. Cl.
*G06F 16/00* (2019.01)
*G06F 16/22* (2019.01)

(52) U.S. Cl.
CPC .................................. *G06F 16/22* (2019.01)

(58) Field of Classification Search
CPC ........................ G06F 17/30312; G06F 16/22
See application file for complete search history.

(56) References Cited

U.S. PATENT DOCUMENTS 9,336,230 B1 * 5/2016 Natanzon .......... G06F 17/30212
2003/0233321 A1 * 12/2003 Scolini .................. G06Q 20/02
705/40

* cited by examiner

*Primary Examiner* — Cheryl Lewis
(74) *Attorney, Agent, or Firm* — Snell & Wilmer L.L.P.

(57) ABSTRACT

A system may read an input file having an input file size and including a first record and a second record. The first and second record may each have a record length. The system may parse the input file into a first split file and a second split file, with the first split file including the first record and the second split file including the second record. The system may distribute the first split file to a first node to generate a first output file and the second split file to a second node to generate a second output file. Any number of additional split files may be distributed to generate any number output files. The system may combine the output files to generate a converted data file.

20 Claims, 4 Drawing Sheets

SYSTEMS AND METHODS FOR PROCESSING BINARY MAINFRAME DATA FILES IN A BIG DATA ENVIRONMENT

FIELD

The present disclosure relates to systems and methods for processing binary mainframe files in a big data environment.

BACKGROUND

Large data sets may exist in various sizes and organizational structures. With big data comprising data sets as large as ever, the volume of data collected incident to increased popularity of online and electronic transactions continues to grow. For example, billions of records (also referred to as rows) and hundreds of thousands of columns worth of data may populate a single table. The large volume of data may be collected in a raw, unstructured, and undescriptive format in some instances.

Data may be ingested into big data storage formats to convert raw binary files into a format useable by analysts. The distributed processing systems may be limited by incoming file formats and ingestion systems restrictive of processing parallelism. Typically, distributed processing systems split input files using a record delimiter. Conversion of binary files into delimited files followed by splitting and processing may result in files being processed multiple times. Additional processing typically means additional processing time. As a result, the ingestion systems may not scale up efficiently in big data environments that ingest binary data files.

SUMMARY

A system, method, and computer readable medium (collectively, the "system") is disclosed for reading a binary file, splitting the binary file based on record length, and processing the split files in a distributed environment. The system may read an input file having an input file size and including a first record and a second record. The first and second record may each have a record length, and the record length may be the same for the first and second record. For example, records in a fixed-width binary mainframe file may have the same length. The system may parse the input file into a first split file and a second split file, with the first split file including at least the first record and having a first file size. The second split file may include at least the second record and have a second file size. The system may distribute the first split file to a first node to generate a first output file and the second split file to a second node to generate a second output file. The system may combine the first output file and the second output file to generate a converted data file.

In various embodiments, the system may retrieve the record length from an object-oriented file containing metadata of the input file such as a JSON file or an XML file. The first node and the second node may be configured as nodes of a distributed file system, and the system may store the converted data file at least partially on the first node and the second node. The input file may be a binary file rather than a delimited text file, and the converted data file may comprise a delimited and/or text-based file. For example, the converted data file may comprise an ASCII file.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big data storage formats containing millions of records (i.e., rows) and numerous variables (i.e., columns) for each record.

The present disclosure provides a system, method, and computer program product for ingesting binary big data files efficiently using distributed processing. The system may read input files in binary format from, for example, mainframe systems. The binary files may contain numerous records, but lack delimiting characters to separate the records. The binary files may be parsed into multiple input files based on the record length, rather than relying on delimiters. The split input files may be processed on distributed nodes in binary format and later recombined to form a single output file in a delimited format.

Figure 1:
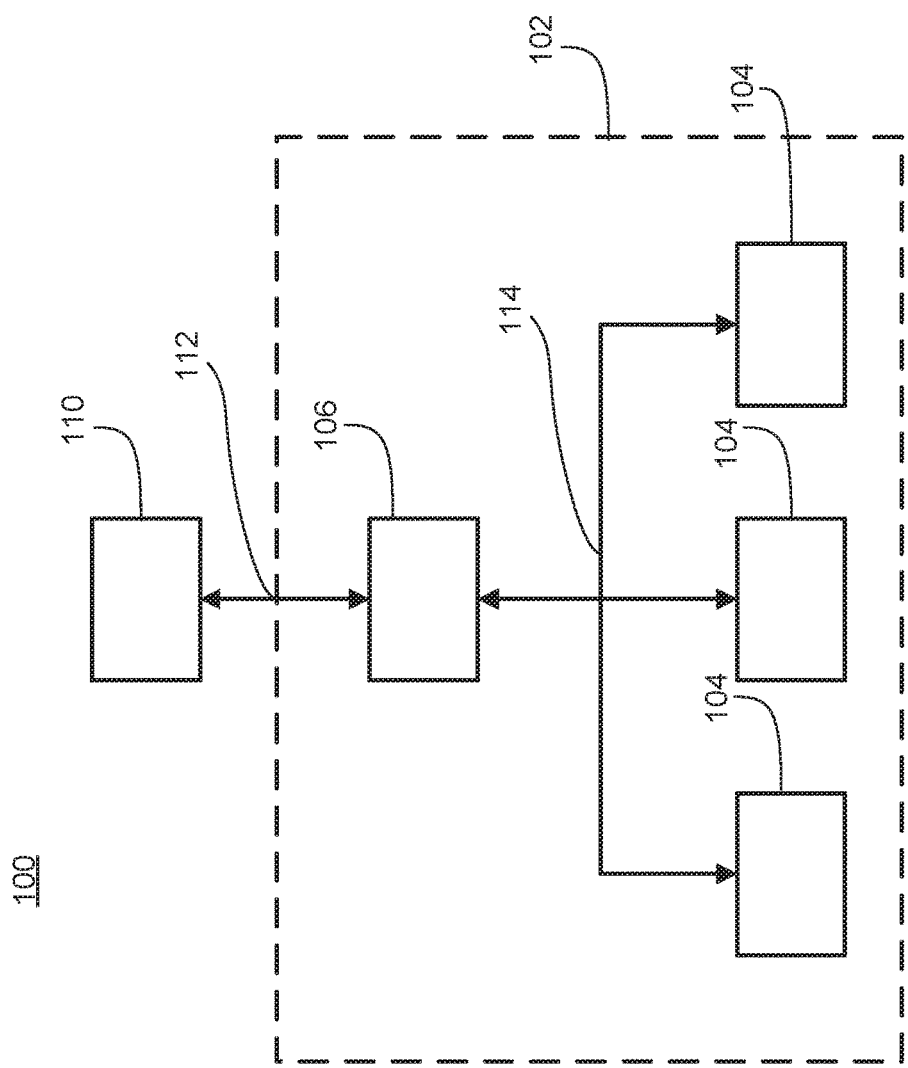
FIG. 1 illustrates an exemplary system for storing, reading, and writing big data sets, in accordance with various embodiments.

With reference to FIG. 1, a distributed file system (DFS) 100 is shown, in accordance with various embodiments. DFS 100 may comprise a distributed computing cluster 102 configured for parallel processing and/or storage. Distributed computing cluster 102 may comprise a plurality of nodes 104 in electronic communication with each of the other nodes, as well as a control node 106. Processing tasks may be split among the nodes of distributed computing cluster 102 to improve throughput and enhance storage capacity. Distributed computing cluster may be, for example, a Hadoop® cluster configured to process and/or store big data sets with some of nodes 104 comprising a distributed storage system and some of nodes 104 comprising a distributed processing system. In that regard, distributed computing cluster 102 may be configured to support a Hadoop® distributed file system (HDFS) as specified by the Apache Software Foundation at http://hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones, tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may thus limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments, DFS 100 may process hundreds of thousands of records from a single data source. DFS 100 may also ingest data from hundreds of data sources. Nodes 104 may process the data in parallel to expedite the processing. Furthermore, the transformation and intake of data (as disclosed below) may be carried out in memory on nodes 104. For example, in response to receiving a source data file of 100,000 records, a system with 100 nodes 104 may distribute the task of processing 1,000 records to each node 104. Each node 104 may process the stream of 1,000 records, while maintaining the current data in memory for processing and writing resultant data to disk. In that regard, the results may be written, augmented, logged, and written to disk for subsequent retrieval. The results may be written to disks using various big data storage formats.

Figure 2:
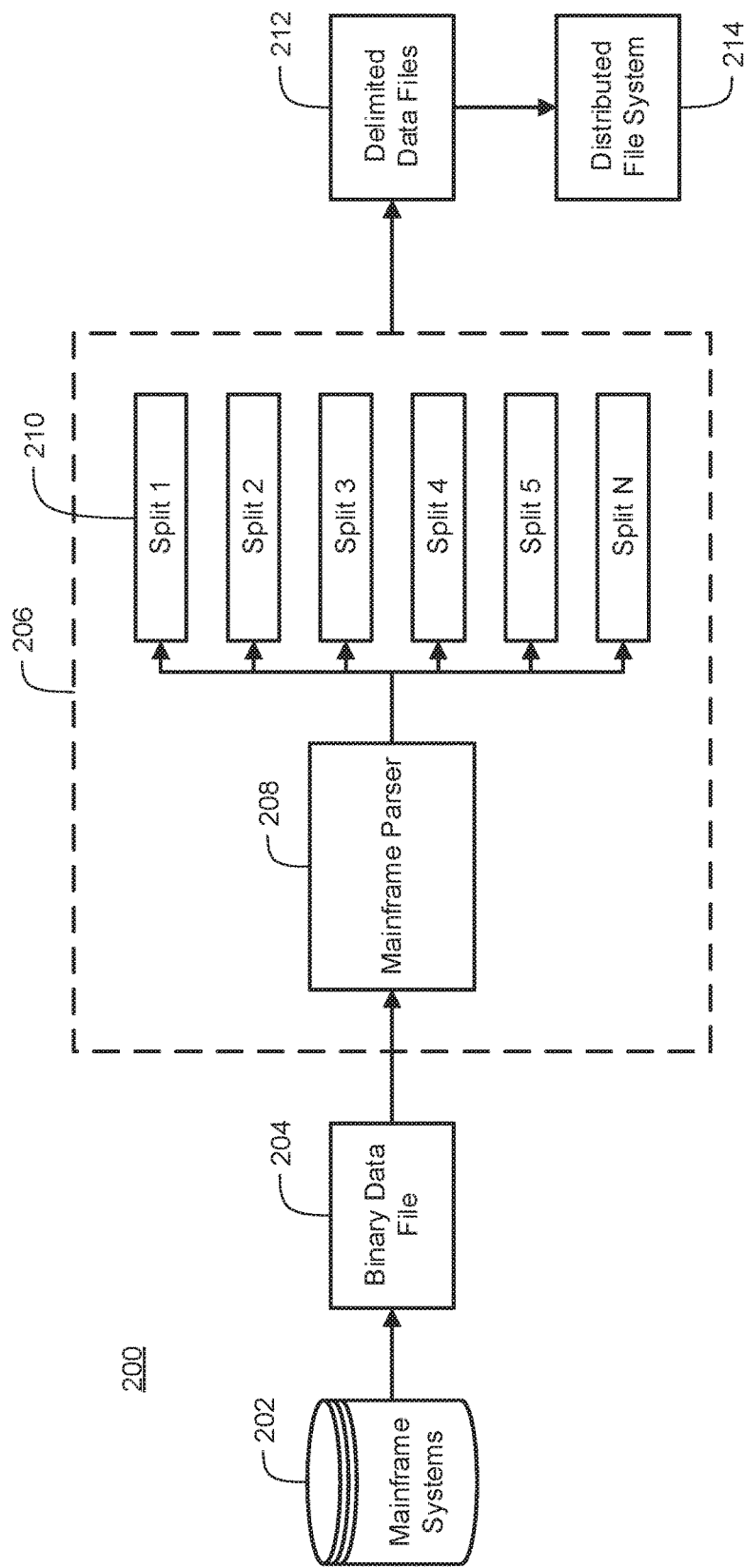
FIG. 2 illustrates exemplary system architecture for processing binary data files using a distributed processing and file system, in accordance with various embodiments.

With reference to FIG. 2, architecture of system 200 is shown for splitting and/or processing binary files on DFS 100 is shown, in accordance with various embodiments. In various embodiments, mainframe systems 202 may generate binary data files 204. Binary data files may be output files configured for translation into text based files. Binary data file 204 may comprise a plurality of records (e.g., rows in a data table) concatenated end to end to form the binary file (e.g., a data table). Binary data file 204 may not include data in a text-based encoding such as ASCII or UTF-8. Instead, the binary data file 204 may include raw binary data in a compressed or uncompressed format.

In various embodiments, metadata describing binary data file 204 may be generated by mainframe systems 202 and output as a separate file and/or as a header or footer of binary data file 204. Metadata may include record byte length, field byte length, field data type, number of records, or other descriptive metadata for binary data file 204. Binary data file 204 may be read as input by processing system 206.

In various embodiments, mainframe parser 208 of processing system 206 may evaluate binary data file 204 to generate split input files 210. For example, a custom record reader implementation in mainframe parser 208 may evaluate binary data file 204 and determine an optimal size for split input files, thereby creating a custom input split for processing and conversion at individual nodes. Binary data file 204 may be evaluated based on its size in terms of storage space (e.g., bits and bytes) and/or its record size (e.g., the number of records in binary data file 204). For example, mainframe parser 208 may identify 1,000,000 bytes in binary data file with each record having a length of 1,000 bytes. Mainframe parser 208 may thus determine that binary data file 204 includes 1,000 records. Mainframe parser 208 may determine an optimal size for split input files 210 for distribution to nodes 104 for processing and/or storage. For example, the optimal size of split input files may be 100 records and mainframe parser 208 may thus split the 1,000 records of binary data file 204 into ten files each containing 100 records. A custom implementation of a record reader in mainframe parser 208 may ensure that complete records are pushed to the split input files 210, and any partial records are combined into a single record and pushed to either the current split input file 210 or the next split input file 210. Split input files 210 may contain an unequal number of records as desired to distribute processing tasks for the entire binary data file 204, for example, when the number of records in binary data file 204 is not divisible by record size and/or when partial records are detected in consecutive split input files 210.

In various embodiments, each split input file 210 may then be processed on a node 104 to produce output files. Output files may be in the form of delimited data files 212. Each delimited data file 212 may contain text results of processing data from a corresponding split input file. For example, the records in a split input file 210 may be processed by mainframe parser 208 on DFS 100 to generate a delimited data file containing the results from mapping each record in split input file 210. Delimited data files 212 may be combined into a single output file and stored on a DFS 214. DFS 214 may be similar and/or identical to DFS 100 of FIG. 1. By parsing the binary data file using record length, system 200 may enhance parallel processing of binary files and improve distributed processing efficiency.

Figure 3:
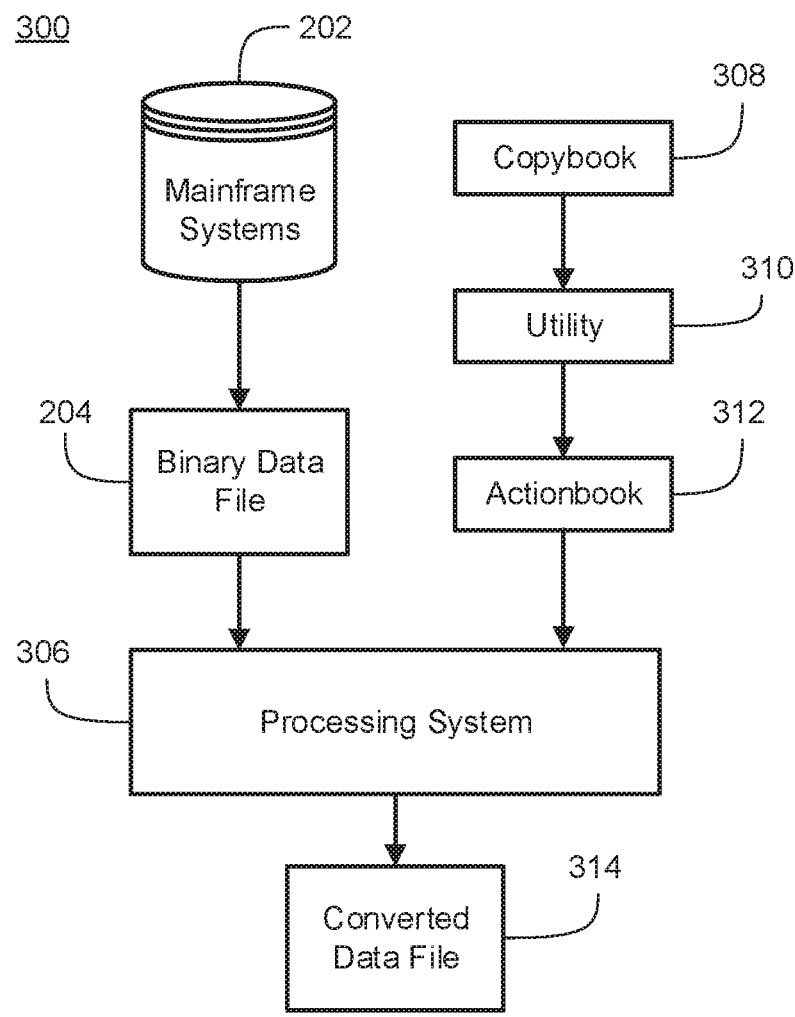
FIG. 3 illustrates an exemplary data flow for processing binary data files using a distributed processing and file system, in accordance with various embodiments.

With reference to FIG. 3, an exemplary data flow 300 for splitting and processing a binary file on DFS 100 is shown, in accordance with various embodiments. Mainframe systems 202 may generate binary data file 204. Binary data file 204 may be used as an input to processing system 306.

In various embodiments, a copybook 308 may describe a layout of the mainframe binary data contained in binary data file 204. Layout information may be metadata describing records in binary data file 204 such as record length, field length, field data type, number of records, columns per record, or other descriptive metadata for binary data file 204. The metadata stored in copybook 308 may be in a binary format or a text-based format. Copybook may be fed into a utility 310 that converts the metadata in copybook 308 into an object-oriented format such as JSON or XML. Metadata stored in the object-oriented format is referred to as an actionbook 312. In that regard, actionbook 312 may contain tagged and/or structured metadata for use in parsing and processing binary data file 204. The metadata stored in actionbook 312 may then be used by mainframe parser 208 to read split input files 210 and convert the split input files 210 containing binary records into text-based, delimited output records.

In various embodiments, processing system 206 may be configured to apply transformations using a MapReduce layer, such as the Hadoop® MapReduce framework described above, for processing big data sets in a parallel, distributed manner to produce records text-based records in a converted data file 314. In that regard, each node 104 configured to process a split input file 210 may be referred to as a mapper. Each node 104 may also access actionbook 312 to facilitate mapping. Processing system 206 may include functionality to parse split input files 210. The functionality to parse split input files 210 may be custom generated or, in various embodiments, the functionality may be implemented by extending existing classes and/or overriding selected methods from a preexisting framework.

In various embodiments, processing system 206 may read actionbook 312 and provide functionality to process rows. Processing system 206 operating on node 104 may calculate the file size of split input file 210 and calculate the number of records in split input file 210 using record length. Record length may be retrieved from actionbook 312. Processing system 206 may also calculate partial records, if any, present in a file.

In various embodiments, processing system 206 may read a record and the corresponding record offset to pass the information to a mapper. The mapper may convert binary records to text-based records (e.g., ASCII or UTF-8 records). The mapper may also convert data types such as comp decimals, signed decimals, zoned decimals, string, integer, float, and other field types. The mapper may get keys and values used in mapping based on the record length. The current file position in the mapping process may also be determined based on metadata such as record length stored in actionbook 312 and/or field length stored in actionbook 312. When an embodiments uses the MapReduce Hadoop® framework, the initialize( ), nextKeyValue( ), and getProgress( ) functions available in the RecordReader class may be overridden, among others, to implement the above functionality. The RecordReader class of Hadoop is documented as an application programming interface (API) made available at https://hadoop.apache.org/docs/r2.7.1/api/org/apache/hadoop/mapreduce/RecordReader.html. Similarly, functions such as those present in the InputFormat class of Hadoop may be overwritten to enable parsing of binary files. The InputFormat class of Hadoop is documented in API format and made available at http://hadoop.apache.org/docs/r2.7.1/api/org/apache/hadoop/mapreduce/InputFormat.html.

In various embodiments, processing system 206 may loop through a complete record (e.g., a row in a table) to identify the columns in the data and convert the columns into a delimited format. Processing system 206 may process each record contained in split input file 210 to generate an output file containing a delimited format of each record. Processing system 206 may check the file position and the next split input file 210 start point to determine if one or more records were left out and should be processed. The output generated by each node 104 will be a converted data file 314 containing the text-based records generated by processing system 306 from a split input file 210. The converted data files 314 from each split input file 210 may be combined to form a single converted output file. The output file may be stored across nodes 104 of DFS 100.

Figure 4:
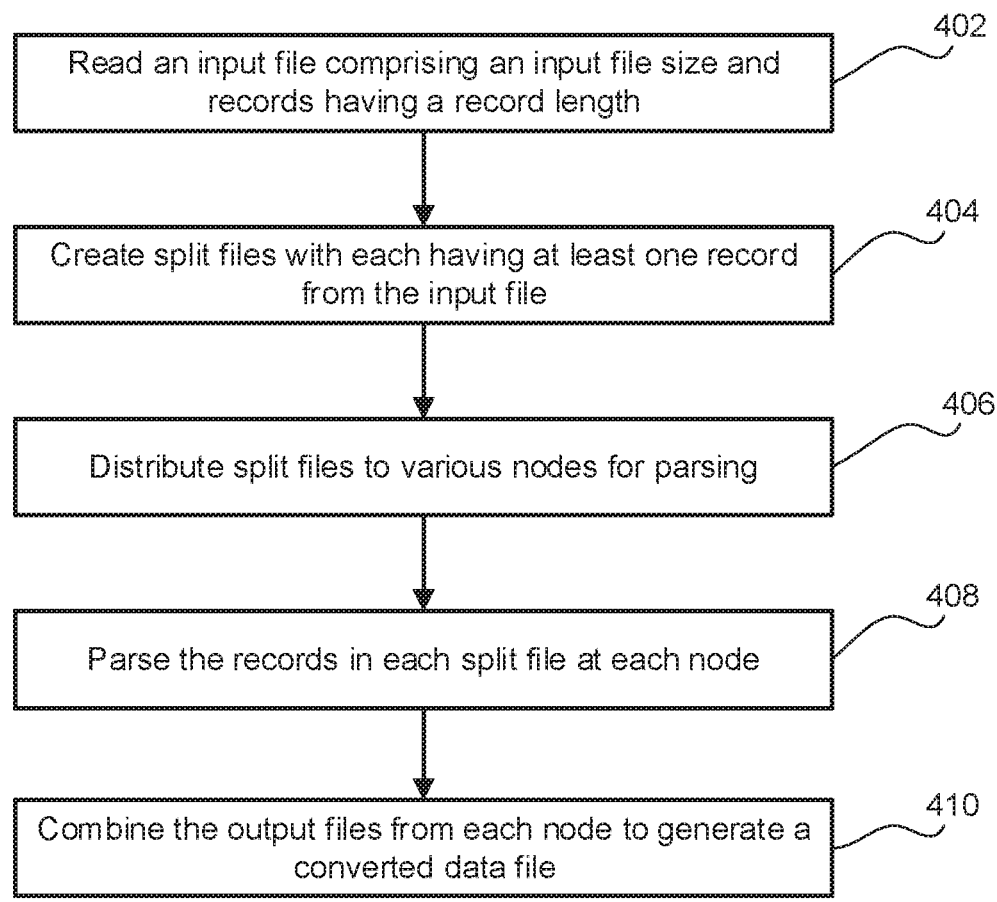
FIG. 4 illustrates an exemplary process for ingesting binary data files into a distributed processing and file system, in accordance with various embodiments.

With reference to FIG. 4, a process 400 for splitting and processing a binary data file 204 on DFS 100 is shown, in accordance with various embodiments. The process may include reading an input file having an input file size (Block 402). The input file may have an input file size. The input file may also be a binary file and may be generated by a mainframe system. The input file may be parsed into a first split file and a second split file using the record length (Block 404). For example, the size of the split files may be calculated by multiplying the record length. In that regard, the file size of the first split file and the second split file may or may not be divisible by the record length. The number of records in the input file may thus be calculated by dividing the input file size by the record length in various embodiments where the input file size is divisible by record length. The file size may be used to allocate a desired number of records to each split file based on the desired split input file size. The record length may be retrieved from an object-oriented file (e.g., an actionbook) containing metadata of the input file, such as a JSON file or an XML file.

In various embodiments, the first split file may be distributed to a first node to generate a first output file (Block 406), and the second split file may be distributed to a second node to generate a second output file (Block 408). In fact, any number of split input files may be distributed to any number of nodes for processing and conversion depending on the number of nodes available in DFS 100 and the desired split input file size. The distributed split input files may be read using parsing logic available on the individual nodes to generate an output file at the individual nodes. The first node and second node may be configured as nodes of a DFS 100, and the converted data file may be stored at least partially on the first node and the second node of DFS 100. In various embodiments, the first and second output files may be combined to generate a converted data file (Block 410). In fact, any number of output files may be combined to generate the converted data file, with the number of output files dependent upon the number of split input files distributed to various nodes. The converted data file may comprise a delimited and/or text-based file. For example, the converted data file may comprise an ASCII file. The text-based file may be formatted for storage and retrieval using a big data storage format such as HIVE®, PIG, and/or SOLR®.

The systems and methods herein provide an efficient system for splitting binary files across multiple nodes of a distributed file system and processing the split binary files on various nodes. The system may avoid processing whole binary files that do not contain record delimiters by using the record length and/or file length to split the files into binary split files containing whole records. The split binary files may then be processed on distributed nodes to convert the binary files into delimited output files. The system reduces file processing time as translation steps (e.g., from binary to delimited) and processing steps (e.g., to apply transformations) are applied at the node level at various nodes.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, flash disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described above. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
reading, by a processor, a binary data file in copybook;
converting, by the processor, metadata of the binary data file into actionbook;
retrieving, by the processor, a record length from the metadata in the actionbook;
determining, by the processor, a number of records in the binary data file by dividing a size of the binary data file by the record length;
determining, by the processor, file sizes for split input files based on the number of records in the binary data file;
parsing, by the processor and based on the file sizes, records in the binary data file into the split input files;
reading, by the processor using the metadata, the split input files;

converting, by the processor using a node, the split input files into delimited output records;

distributing, by the processor, the delimited output records to different nodes; and combining, by the processor, at least a subset of the delimited output records to generate a converted data file.

2. The method of claim 1, further comprising:

combining, by the processor, partial records of the binary data file into a single record; and pushing, by the processor, the single record into a current split input file or a next split input file of the split input files.

3. The method of claim 1, further comprising:

calculating, by the processor operating on the node, a file size of a split input file of the split input files;

retrieving, by the processor and from the actionbook, a record length of the split input file; and calculating, by the processor, a number of records in the split input file using the record length.

4. The method of claim 3, further comprising storing, by the processor, the converted data file at least partially on a first node and at least partially on a second node.

5. The method of claim 1, further comprising reading, by the processor, record offsets corresponding to the respective records.

6. The method of claim 1, further comprising converting, by the processor using the node, data types, wherein the data types include at least one of comp decimals, signed decimals, zoned decimals, string, integer or float.

7. The method of claim 1, further comprising determining, by the processor, a current file position in a mapping process based on metadata stored in the actionbook.

8. The method of claim 1, wherein the delimited output records are text-based and contain text results of processing data from the split input file.

9. The method of claim 1, wherein the copybook describes layout information of binary data in the binary data file, wherein the layout information includes the metadata that describes records in the binary data file, wherein the records include at least one of record length, field length, field data type, number of records or columns per record, and wherein the metadata in the copybook is stored in a binary format or a test-based format.

10. The method of claim 1, wherein the actionbook includes the metadata stored in object-oriented format, wherein the object-oriented format includes at least one of JSON or XML, wherein the actionbook includes tagged metadata or structured metadata that parses and processes the binary data file, and wherein a node accesses actionbook to map and parse the split input files.

11. The method of claim 1, further comprising checking, by the processor, a file position a next split file start point to determine if a record was left out.

12. A computer-based system, comprising:

a processor; and a tangible, non-transitory memory configured to communicate with the processor, the tangible, non-transitory memory having instructions stored thereon that, in response to execution by the processor, cause the processor to perform operations comprising:

reading, by the processor, a binary data file in copybook;

converting, by the processor, metadata of the binary data file into actionbook;

retrieving, by the processor, a record length from the metadata in the actionbook;

determining, by the processor, a number of records in the binary data file by dividing a size of the binary data file by the record length;

determining, by the processor, file sizes for split input files based on the number of records in the binary data file;

parsing, by the processor and based on the file sizes, records in the binary data file into the split input files;

reading, by the processor using the metadata, the split input files;

converting, by the processor using a node, the split input files into delimited output records;

distributing, by the processor, the delimited output records to different nodes; and combining, by the processor, at least a subset of the delimited output records to generate a converted data file.

13. The computer-based system of claim 12, further comprising converting, by the processor using the node, data types, wherein the data types include at least one of comp decimals, signed decimals, zoned decimals, string, integer or float.

14. The computer-based system of claim 12, further comprising determining, by the processor, a current file position in a mapping process based on metadata stored in the actionbook.

15. An article of manufacture including a non-transitory, tangible computer readable storage medium having instructions stored thereon that, in response to execution by a processor, cause the processor to perform operations comprising:

reading, by the processor, a binary data file in copybook;

converting, by the processor, metadata of the binary data file into actionbook;

retrieving, by the processor, a record length from the metadata in the actionbook;

determining, by the processor, a number of records in the binary data file by dividing a size of the binary data file by the record length;

determining, by the processor, file sizes for split input files based on the number of records in the binary data file;

parsing, by the processor and based on the file sizes, records in the binary data file into the split input files;

reading, by the processor using the metadata, the split input files;

converting, by the processor using a node, the split input files into delimited output records;

distributing, by the processor, the delimited output records to different nodes;

and combining, by the processor, at least a subset of the delimited output records to generate a converted data file.

16. The article of claim 15, further comprising:

combining, by the processor, partial records of the binary data file into a single record; and pushing, by the processor, the single record into a current split input file or a next split input file of the split input files.

17. The article of claim 15, further comprising:

calculating, by the processor operating on the node, a file size of the split input file;

retrieving, by the processor and from the actionbook, a record length of the split input file; and calculating, by the processor, a number of records in the split input file using the record length.

18. The article of claim 15, further comprising reading, by the processor, record offsets corresponding to the respective records.

19. The article of claim 15, further comprising converting, by the processor using the node, data types, wherein the data types include at least one of comp decimals, signed decimals, zoned decimals, string, integer or float.

20. The article of claim 15, further comprising determining, by the processor, a current file position in a mapping process based on metadata stored in the actionbook.

* * * * *